US012574917B2

(12) United States Patent
Maamari et al.

(10) Patent No.: US 12,574,917 B2
(45) Date of Patent: Mar. 10, 2026

(54) SCHEDULING REQUEST CONFIGURATION

(71) Applicant: QUALCOMM Incorporated, San Diego, CA (US)

(72) Inventors: Diana Maamari, San Diego, CA (US); Mickael Mondet, Louannec (FR); Prashanth Haridas Hande, San Diego, CA (US); Yih-Hao Lin, San Diego, CA (US); Hyun Yong Lee, San Diego, CA (US); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/661,441

(22) Filed: Apr. 29, 2022

(65) Prior Publication Data

US 2023/0354293 A1    Nov. 2, 2023

(51) Int. Cl.
*H04W 72/12*        (2023.01)
*H04W 72/21*        (2023.01)

(52) U.S. Cl.
CPC ........... *H04W 72/12* (2013.01); *H04W 72/21* (2023.01)

(58) Field of Classification Search
CPC .............. H04W 72/569; H04W 72/23; H04W 28/0278; H04W 52/0216; H04W 72/1263; H04W 72/12; G06N 20/00; G06N 3/02
See application file for complete search history.

(56) References Cited

U.S. PATENT DOCUMENTS

| | | | | |
|---|---|---|---|---|
| 2017/0094593 A1* | 3/2017 | Deng | .................... | H04W 52/02 |
| 2018/0035329 A1* | 2/2018 | Futaki | .............. | H04W 72/0453 |
| 2020/0163005 A1* | 5/2020 | Rao | .......................... | H04W 4/44 |
| 2021/0144582 A1* | 5/2021 | Yi | .......................... | H04W 72/23 |
| 2021/0360469 A1* | 11/2021 | Shrestha | .............. | H04W 72/23 |
| 2023/0389057 A1* | 11/2023 | Deenoo | ................. | H04W 72/50 |

FOREIGN PATENT DOCUMENTS

| | | | | |
|---|---|---|---|---|
| WO | WO-2022086984 A1 * | 4/2022 | ............. | G06N 20/10 |

* cited by examiner

*Primary Examiner* — Yee F Lam
(74) *Attorney, Agent, or Firm* — Harrity & Harrity, LLP

(57)                    ABSTRACT

Various aspects of the present disclosure generally relate to wireless communication. In some aspects, a user equipment (UE) may transmit, to a network entity, UE assistance information that indicates one or more scheduling request parameters. The UE may receive, from the network entity, a scheduling request configuration that is based at least in part on the one or more scheduling request parameters. Numerous other aspects are described.

30 Claims, 12 Drawing Sheets

500

700

710 — Transmit, to a network entity, UE assistance information that indicates one or more scheduling request parameters 720 — Receive, from the network entity, a scheduling request configuration that is based at least in part on the one or more scheduling request parameters 810 — Receive, from a UE, UE assistance information that indicates one or more scheduling request parameters 820 — Transmit, to the UE, a scheduling request configuration that is based at least in part on the one or more scheduling request parameters

800

Receive, from a network entity, a plurality of scheduling request configurations Select a scheduling request configuration, from the plurality of scheduling request configurations, based at least in part on uplink traffic information Transmit, to the network entity, an indication of the selected scheduling request configuration

910

920

930

900

1010   Transmit, to a UE, a plurality of scheduling request configurations

1020   Receive, from the UE, an indication of a selected scheduling request configuration that is based at least in part on uplink traffic information

1000

SCHEDULING REQUEST CONFIGURATION

FIELD OF THE DISCLOSURE

Aspects of the present disclosure generally relate to wireless communication and to techniques and apparatuses for scheduling request configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting, to a network entity, UE assistance information that indicates one or more scheduling request parameters; and receiving, from the network entity, a scheduling request configuration that is based at least in part on the one or more scheduling request parameters.

In some aspects, a method of wireless communication, performed by a network entity, may include receiving, from a UE, UE assistance information that indicates one or more scheduling request parameters; and transmitting, to the UE, a scheduling request configuration that is based at least in part on the one or more scheduling request parameters.

In some aspects, a method of wireless communication, performed by a UE, may include receiving, from a network entity, a plurality of scheduling request configurations; selecting a scheduling request configuration, from the plurality of scheduling request configurations, based at least in part on uplink traffic information; and transmitting, to the network entity, an indication of the selected scheduling request configuration.

In some aspects, a method of wireless communication, performed by a network entity, may include transmitting, to a UE, a plurality of scheduling request configurations; and receiving, from the UE, an indication of a selected scheduling request configuration that is based at least in part on uplink traffic information.

In some aspects, a UE for wireless communication may include memory and one or more processors coupled to the memory. For example, the one or more processors may be operatively, electronically, communicatively, or otherwise coupled to the memory. The memory may comprise instructions executable by the one or more processors to cause the UE to: transmit, to a network entity, UE assistance information that indicates one or more scheduling request parameters; and receive, from the network entity, a scheduling request configuration that is based at least in part on the one or more scheduling request parameters.

In some aspects, a network entity for wireless communication may include memory and one or more processors coupled to the memory. For example, the one or more processors may be operatively, electronically, communicatively, or otherwise coupled to the memory. The memory may comprise instructions executable by the one or more processors to cause the network entity to: receive, from a UE, UE assistance information that indicates one or more scheduling request parameters; and transmit, to the UE, a scheduling request configuration that is based at least in part on the one or more scheduling request parameters.

In some aspects, a UE for wireless communication may include memory and one or more processors coupled to the memory. For example, the one or more processors may be operatively, electronically, communicatively, or otherwise coupled to the memory. The memory may comprise instructions executable by the one or more processors to cause the UE to: receive, from a network entity, a plurality of scheduling request configurations; select a scheduling request configuration, from the plurality of scheduling request configurations, based at least in part on uplink traffic information; and transmit, to the network entity, an indication of the selected scheduling request configuration.

In some aspects, a network entity for wireless communication may include memory and one or more processors coupled to the memory. For example, the one or more processors may be operatively, electronically, communicatively, or otherwise coupled to the memory. The memory may comprise instructions executable by the one or more processors to cause the network entity to: transmit, to a UE, a plurality of scheduling request configurations; and receive, from the UE, an indication of a selected scheduling request configuration that is based at least in part on uplink traffic information.

In some aspects, a non-transitory computer-readable medium may store one or more instructions for wireless communication. The one or more instructions, when executed by one or more processors of a UE, may cause the UE to: transmit, to a network entity, UE assistance information that indicates one or more scheduling request parameters; and receive, from the network entity, a scheduling request configuration that is based at least in part on the one or more scheduling request parameters.

In some aspects, a non-transitory computer-readable medium may store one or more instructions for wireless communication. The one or more instructions, when executed by one or more processors of a network entity, may cause the network entity to: receive, from a UE, UE assistance information that indicates one or more scheduling request parameters; and transmit, to the UE, a scheduling request configuration that is based at least in part on the one or more scheduling request parameters.

In some aspects, a non-transitory computer-readable medium may store one or more instructions for wireless communication. The one or more instructions, when executed by one or more processors of a UE, may cause the UE to: receive, from a network entity, a plurality of scheduling request configurations; select a scheduling request configuration, from the plurality of scheduling request configurations, based at least in part on uplink traffic information; and transmit, to the network entity, an indication of the selected scheduling request configuration.

In some aspects, a non-transitory computer-readable medium may store one or more instructions for wireless communication. The one or more instructions, when executed by one or more processors of a network entity, may cause the network entity to: transmit, to a UE, a plurality of scheduling request configurations; and receive, from the UE, an indication of a selected scheduling request configuration that is based at least in part on uplink traffic information.

In some aspects, an apparatus for wireless communication may include means for transmitting, to a network entity, UE assistance information that indicates one or more scheduling request parameters; and means for receiving, from the network entity, a scheduling request configuration that is based at least in part on the one or more scheduling request parameters.

In some aspects, an apparatus for wireless communication may include means for receiving, from a UE, UE assistance information that indicates one or more scheduling request parameters; and means for transmitting, to the UE, a scheduling request configuration that is based at least in part on the one or more scheduling request parameters.

In some aspects, an apparatus for wireless communication may include means for receiving, from a network entity, a plurality of scheduling request configurations; means for selecting a scheduling request configuration, from the plurality of scheduling request configurations, based at least in part on uplink traffic information; and means for transmitting, to the network entity, an indication of the selected scheduling request configuration.

In some aspects, an apparatus for wireless communication may include means for transmitting, to a UE, a plurality of scheduling request configurations; and means for receiving, from the UE, an indication of a selected scheduling request configuration that is based at least in part on uplink traffic information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
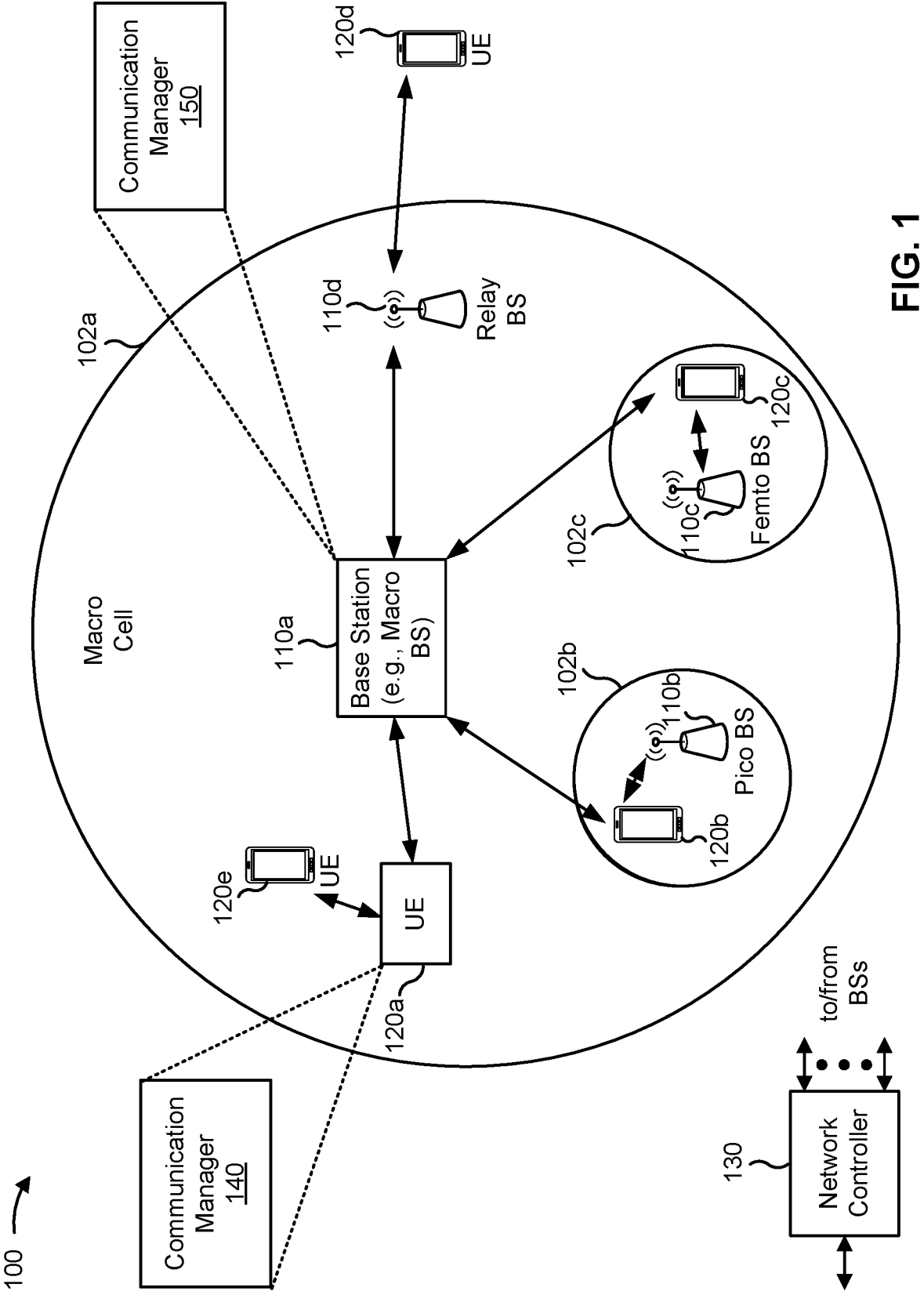
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network entity, UE assistance information that indicates one or more scheduling request parameters; and receive, from the network entity, a scheduling request configuration that is based at least in part on the one or more scheduling request parameters. Additionally, or alternatively, the communication manager 140 may perform one or more other operations described herein.

In some aspects, the communication manager 140 may receive, from a network entity, a plurality of scheduling request configurations; select a scheduling request configuration, from the plurality of scheduling request configurations, based at least in part on uplink traffic information; and transmit, to the network entity, an indication of the selected scheduling request configuration. Additionally, or alternatively, the communication manager 140 may perform one or more other operations described herein.

In some aspects, a network entity (e.g., the base station 110) may include a communication manager 150. As described in more detail elsewhere herein, the communication manager 150 may receive, from a UE, UE assistance information that indicates one or more scheduling request parameters; and transmit, to the UE, a scheduling request configuration that is based at least in part on the one or more scheduling request parameters. Additionally, or alternatively, the communication manager 150 may perform one or more other operations described herein.

In some aspects, the communication manager 150 may transmit, to a UE, a plurality of scheduling request configurations; and receive, from the UE, an indication of a selected scheduling request configuration that is based at least in part on uplink traffic information. Additionally, or alternatively, the communication manager 150 may perform one or more other operations described herein.

As indicated above, FIG. 1 is provided as an example. Other examples may differ from what is described with regard to FIG. 1.

Figure 2:
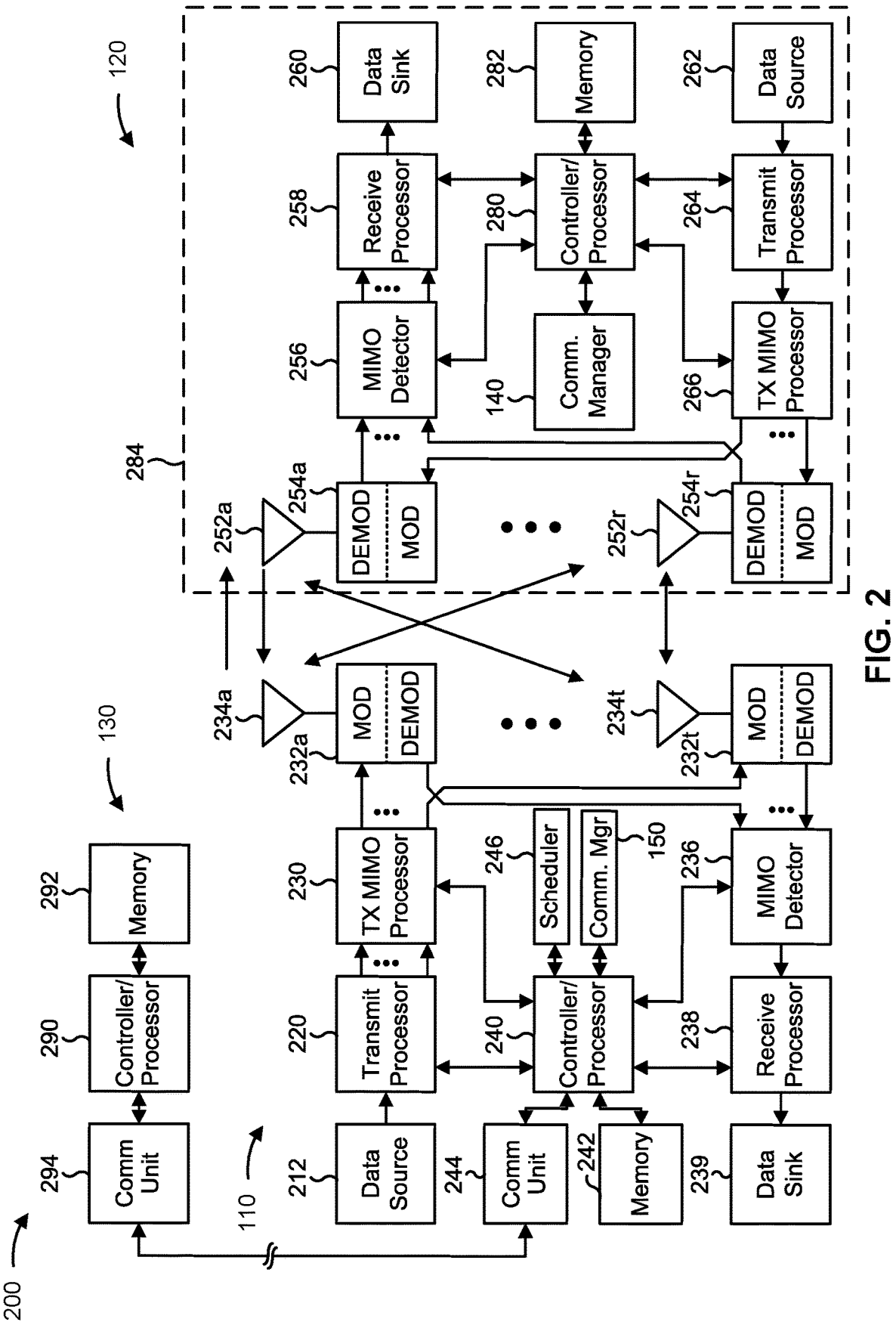
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the base station 110, the controller/processor 280 of the UE 120, and/or any other component(s) of FIG. 2 may perform one or more techniques associated with SR configuration, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting, to a network entity, UE assistance information that indicates one or more scheduling request parameters; and/or means for receiving, from the network entity, a scheduling request configuration that is based at least in part on the one or more scheduling request parameters. The means for the UE to perform operations described herein may include, for example, one or more of communication manager 140, antenna 252, modem 254, MIMO detector

256, receive processor 258, transmit processor 264, TX MIMO processor 266, controller/processor 280, or memory 282.

In some aspects, a network entity includes means for receiving, from a UE, UE assistance information that indicates one or more scheduling request parameters; and/or means for transmitting, to the UE, a scheduling request configuration that is based at least in part on the one or more scheduling request parameters. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving, from a network entity, a plurality of scheduling request configurations; means for selecting a scheduling request configuration, from the plurality of scheduling request configurations, based at least in part on uplink traffic information; and/or means for transmitting, to the network entity, an indication of the selected scheduling request configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting, to a UE, a plurality of scheduling request configurations; and/or means for receiving, from the UE, an indication of a selected scheduling request configuration that is based at least in part on uplink traffic information. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
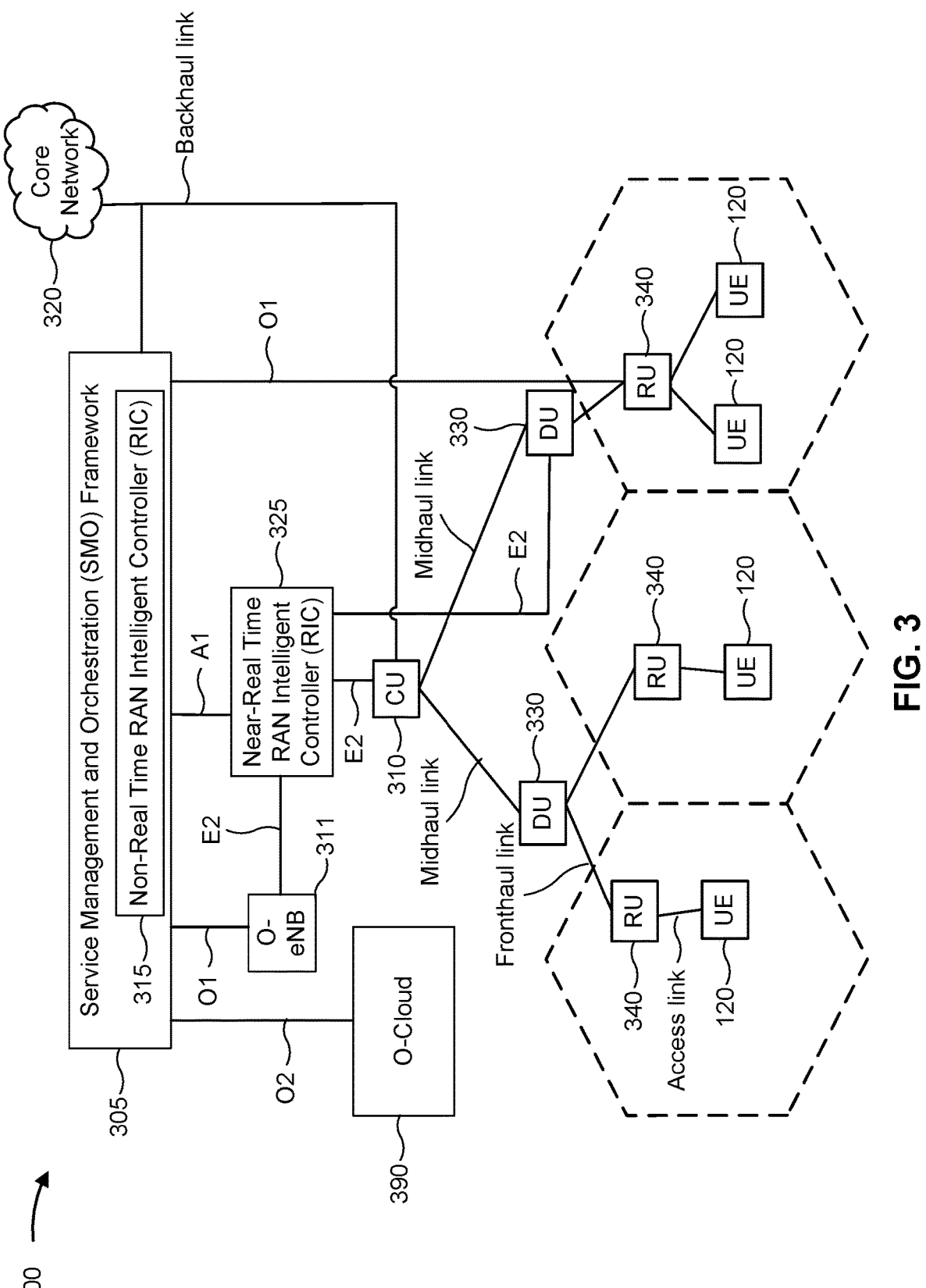
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
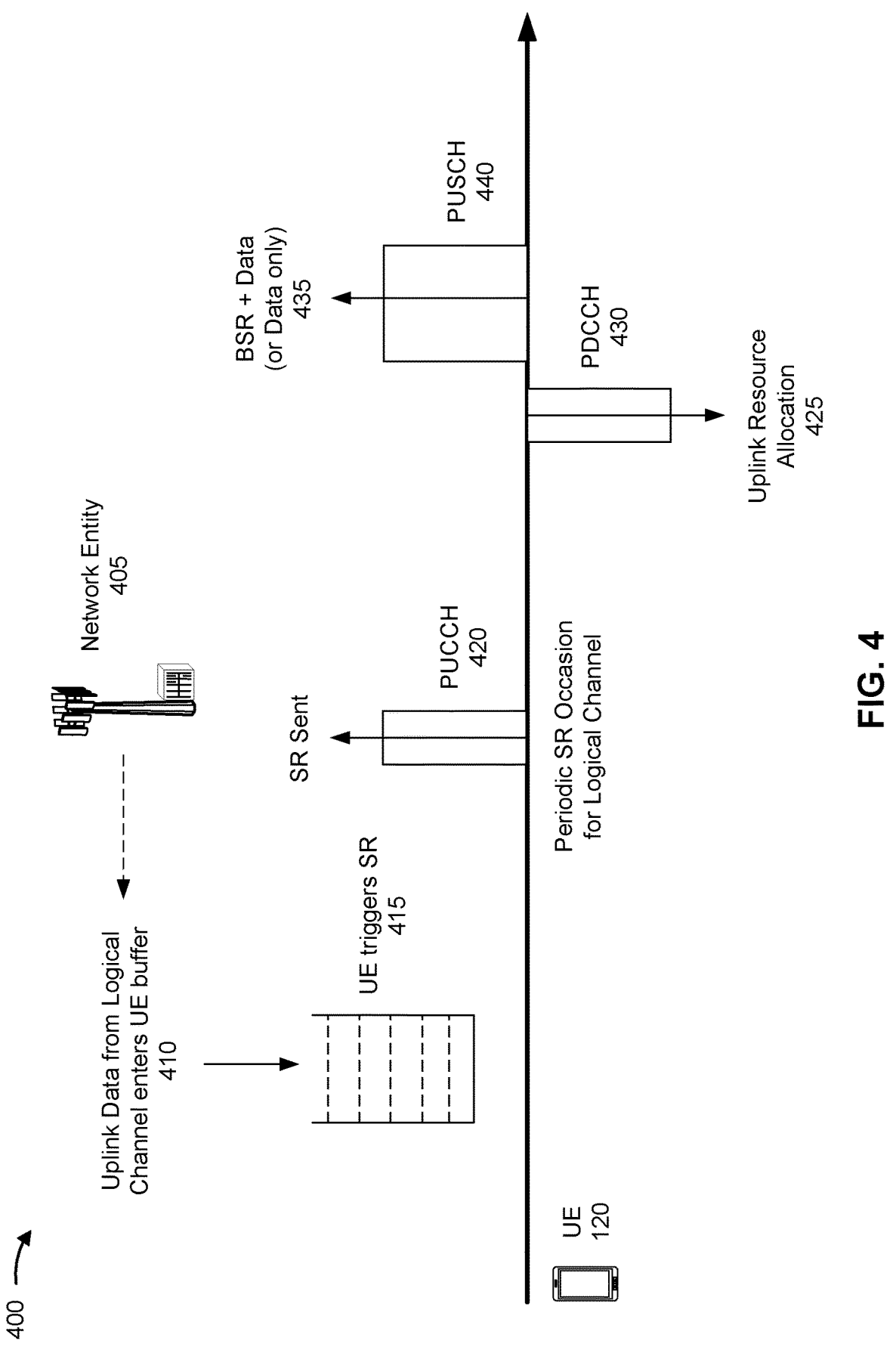
FIG. 4 is a diagram illustrating an example of a scheduling request (SR) procedure, in accordance with the present disclosure.

FIG. 4 is a diagram illustrating an example 400 of a scheduling request procedure, in accordance with the present disclosure. The UE 120 may communicate with a network entity, such as the network entity 405. The network entity 405 may include some or all of the features of the base station 110, the CU 310, the DU 330, and/or the RU 340.

In some cases, a scheduling request (SR) procedure may be a mechanism for requesting resources (e.g., air-interface resources) for a new uplink transmission. As shown in connection with reference number 410, uplink data belonging to a logical channel may be queued for transmission within a buffer of the UE 120. As shown in connection with reference number 415, the uplink data may trigger the UE 120 to send the SR using a physical uplink control channel (PUCCH) resource 420. The PUCCH resource 420 may be configured specifically for the logical channel that has the uplink data ready for transmission. The network entity 405 may receive the SR and may be able to deduce the logical channel (or group of logical channels if multiple logical channels have been linked to the same set of PUCCH resources). In some cases, knowledge of the logical channel may help the network entity 405 to prioritize the SR.

As shown in connection with reference number 425, the network entity 405 may proceed to allocate uplink resources on a physical uplink shared channel (PUSCH) by performing a transmission via the physical downlink control channel (PDCCH) 430. As shown in connection with reference number 435, the UE 120 may use the allocated resources to send a buffer status report (BSR), in combination with at least some of the buffered data, via the PUSCH 440. The BSR may provide the network entity 405 with information regarding the volume of data waiting to be transmitted. In some cases, if the UE buffer can be emptied using the initial uplink resource allocation, the UE 120 may exclude the BSR and send only the uplink data.

Once the SR has been triggered, it may be categorized as pending until the SR has been canceled. In some cases, the SR may remain categorized as pending even after it has been transmitted. The SR may be canceled after the UE 120 has received an uplink resource allocation and has sent the BSR, or after the UE 120 has received an uplink resource allocation and has been able to empty the transmission buffers.

In some cases, the SR may be sent using the PUCCH resource 420. In some cases, all of the PUCCH formats (e.g., formats 0, 1, 2, 3, and 4) may be able to accommodate the SR. However, the SR resources may generally be configured using either PUCCH format 0 or format 1. Other PUCCH formats can be used when PUCCH transmissions coincide (e.g., when an SR transmission using PUCCH format 0 coincides with a channel state information (CSI) reporting transmission using PUCCH format 3). In that case, both the SR and the CSI Report can be transmitted using PUCCH format 3.

In some cases, the UE 120 may not be free to transmit the SR at any instant in time. Instead, the network entity 405 may provide the UE 120 with timing information that defines the time instants that the UE 120 is permitted to transmit the SR. The timing information may be associated with an SR periodicity (SR periodicity) and/or an SR offset (SR-offset). The SR periodicity may be an important parameter from the perspective of balancing the tradeoff between the network load and the end-user latency. A short periodicity may create a high load because the UE 120 has PUCCH resources reserved more frequently. For example, the PUCCH resources may be dedicated to the UE 120 and cannot be reused once allocated. One example benefit of a short periodicity is the reduced latency provided by the lower average waiting time for an SR opportunity.

In some cases, a scheduling request resource configuration (SchedulingRequestResourceConfig) parameter structure may configure both the SR periodicity and the SR offset parameters using an SR periodicity and offset information element (periodicityAndOffset). The period may be as short as two symbols for very low latency applications. Alternatively, the period may be up to 640 slots for delay tolerant applications. In some cases, each scheduling request resource configuration parameter may be associated with a scheduling request resource identifier (schedulingRequestResourceID).

In some cases, linking different logical channels to different PUCCH resources may allow the network entity 405 to identify the logical channel which has triggered the SR. This information may be useful when prioritizing the SR. For example, if the logical channel is responsible to transferring data for a low latency application, the network entity 405 can allocate higher priority to the SR. The drawback associated with allocating different PUCCH resources to different logical channels is an increased PUCCH resource requirement. For example, the UE 120 may require multiple sets of PUCCH resources rather than a single set. In some cases, the logical channels may be mapped to the different PUCCH resources using a logical channel configuration (LogicalChannelConfig) parameter.

In some cases, when uplink data arrives, the UE 120 may send an SR using the configured SR PUCCH resources. The SR may be transmitted using preconfigured and periodically occurring PUCCH resources. In some cases, the UE 120 may be assigned dedicated PUCCH SR resources with a periodicity ranging from every other OFDM symbol (to support very latency-critical services) to a periodicity of 80 milliseconds (ms) (80 slots) for low overhead services (e.g., assuming 15 kHz subcarrier spacing (SCS)).

In some cases, an optimal configuration of the SR periodicity and SR offset parameters that considers uplink traffic flow periodicities and time of arrival information may increase the system capacity and may reduce latency and power consumption. In some cases, if the SR periodicity and SR offset parameters are not optimally configured, one or more of the following may occur: a data transmission may be delayed until a next SR uplink transmission opportunity, too many SR resources may be allocated, not enough SR resources may be allocated, or an SR transmission may need to occur outside of a discontinuous reception (DRX) or discontinuous transmission (DTX) active time window. In some cases, latency may be increased based at least in part on the delayed data transmission. In some cases, capacity loss may occur based at least in part on too many SR resources being allocated (e.g., resulting in fewer resources for other transmissions) or based at least in part on not enough SR resources being allocated (e.g., as a result of the UE 120 not being to transmit the SR in time). In some cases, power consumption may increase based at least in part on the communication that occurs outside of the active period of the DRX or DTX cycle.

In one example, the SR may be configured to be transmitted with a periodicity of 5 ms. In this case, the SR transmission may closely follow an uplink data transmission that arrives at the buffer, and a PUSCH transmission may be able to occur in the next uplink opportunity. However, in another example, the SR may be configured to be transmitted with a periodicity of 10 ms. In this case, the uplink data packets (from the uplink data transmission) may need to remain in the buffer until the SR is transmitted. Therefore, the transmission of the uplink data packets may be delayed.

In some cases, the network entity 405 may configure the UE 120 with an SR configuration, such as a configuration for the SR periodicity and the SR offset parameters. However, the network entity 405 may not be aware of uplink traffic information associated with the UE 120 and may not be able to determine an optimal SR configuration for the UE 120. As described above, this may result in increased latency, capacity loss, and increased power consumption. This may be particularly problematic for latency sensitive applications such as extended reality (XR) applications, including virtual reality (VR), augmented reality (AR), and/or mixed reality (MR) applications.

Techniques and apparatuses are described herein for SR configuration. In some aspects, the UE 120 may transmit UE assistance information that indicates one or more SR parameters. For example, the UE assistance information may indicate a preferred SR configuration, an SR periodicity, and/or an SR offset, among other examples. The UE 120 may receive, from the network entity 405, an SR configuration that is based at least in part on the one or more SR parameters. In some aspects, the UE 120 may receive a plurality of SR configurations from the network entity 405, and may select an SR configuration from the plurality of SR configurations based at least in part on uplink traffic information.

As described above, the network entity 405 may configure the UE 120 with an SR configuration. However, the network entity 405 may not be aware of uplink traffic information associated with the UE 120 and may not be able to determine an optimal SR configuration for the UE 120. This may result in increased latency, capacity loss, and increased power consumption. Using the techniques and apparatuses described herein, the network entity 405 may obtain information that enables the network entity 405 to configure the UE with an optimal SR configuration. For example, the network entity 405 may obtain one or more SR parameters or an indication of a preferred SR configuration, and may configure the UE 120 with the optimal SR configuration. This may reduce the likelihood of increased latency, capacity loss, and increased power consumption as a result of SR transmission timing.

As indicated above, FIG. 4 is provided as an example. Other examples may differ from what is described with regard to FIG. 4.

Figure 5:
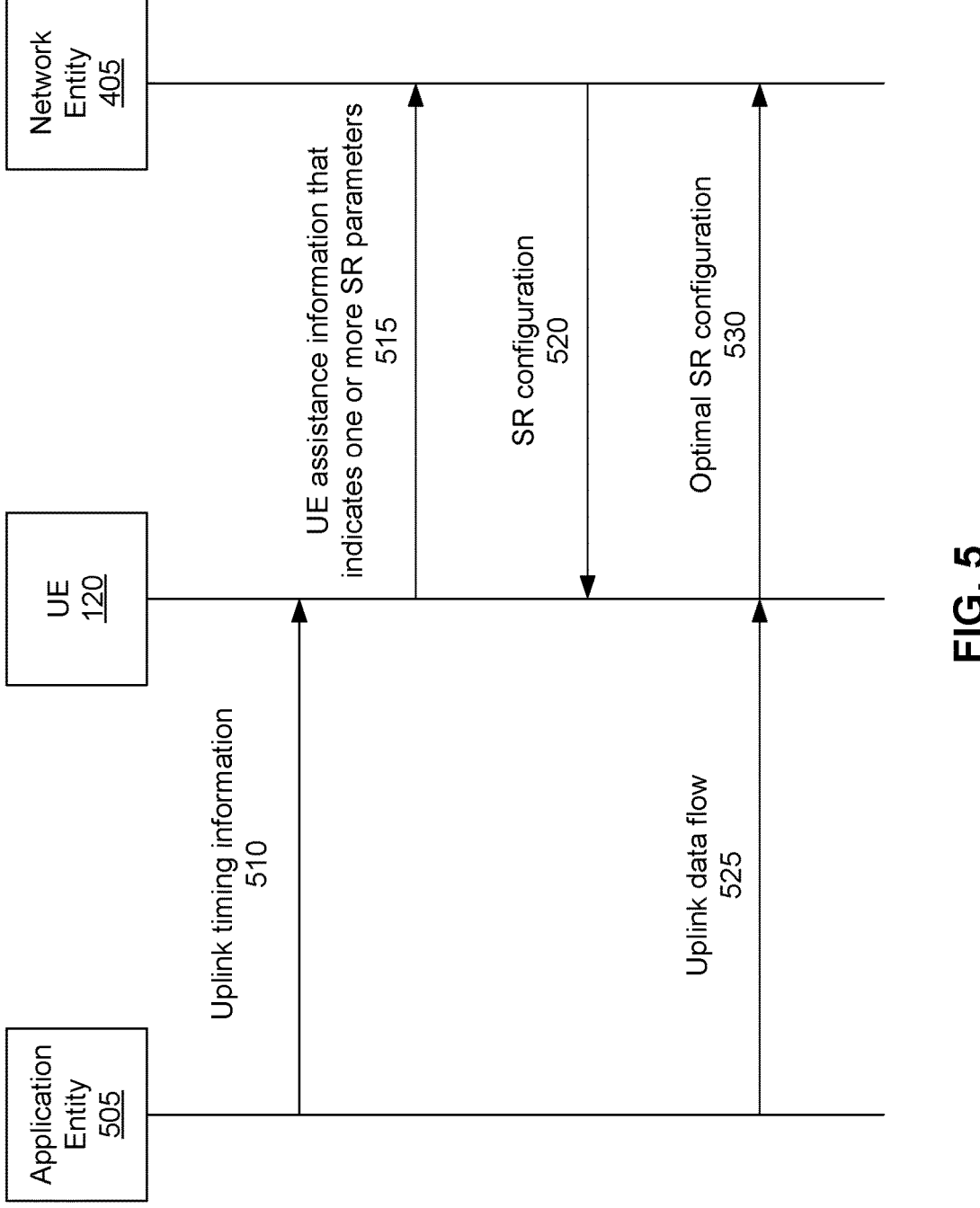
FIG. 5 is a diagram illustrating an example associated with SR configuration, in accordance with the present disclosure.

FIG. 5 is a diagram illustrating an example 500 of SR configuration, in accordance with the present disclosure. The UE 120 may communicate with the network entity 405. The UE 120 may communicate with an application entity 505. In some aspects, the application entity 505 may be associated with an application that is running on the UE 120. For example, UE 120 may include a modem and the application entity 505 may be associated with an application (e.g., an XR application) that is communicating with the modem.

As shown in connection with reference number 510, the application entity 505 may transmit, and the UE 120 may receive, uplink timing information. In some aspects, the UE 120 may receive the uplink timing information using a cross-layer application programming interface (API). For example, the cross-layer API may enable the UE 120 to obtain information associated with the uplink traffic from the application entity 505. In some aspects, the UE 120 may obtain the uplink traffic information based at least in part on a machine learning algorithm. For example, the UE 120 may monitor the traffic that is being received from the application entity 505 and may determine one or more uplink traffic characteristics using the machine learning algorithm.

In some aspects, the uplink timing information may include implicit timing information. For example, the application entity 505 may transmit, and the UE 120 may receive, an indication of a modem cadence or a timing offset associated with the uplink traffic flow. The implicit timing information may be beneficial in the case of several traffic flows since the modem may be able to determine an SR configuration after all of the traffic flows are indicated. In some aspects, the uplink timing information may include explicit timing information. For example, the application entity 505 may transmit, and the UE 120 may receive, the periodicity and offset information element periodicityAndOffset that includes periodicity information associated with the uplink traffic and/or offset information associated with the uplink traffic. In some aspects, the explicit indication may indicate a separate periodicity and offset information element for each of the uplink traffic flows, based at least in part on the presence of multiple uplink traffic flows, and may indicate a joint optimal setting associated with the multiple uplink traffic flows.

In some aspects, the UE 120 may transmit an indication of a preferred sounding reference signal (SRS) offset and periodicity. The indication of the preferred SRS offset and periodicity may be used to align prior uplink data such that the network entity 405 can transmit a scheduled grant with updated channel conditions. For example, the updated channel conditions may be based at least in part on the preferred SRS periodicity and offset information.

As shown in connection with reference number 515, the UE 120 may transmit, and the network entity 405 may receive, UE assistance information that indicates one or more SR parameters.

In some aspects, the UE 120 may obtain information associated with one or more SR parameters. For example, the UE 120 may determine the information associated with the one or more SR parameters, such as the SR periodicity and/or the SR offset parameters, based at least in part on the uplink traffic information received from the application entity 505. In some aspects, based at least in part on the implicit information received from the application entity 505, the UE 120 may determine information (e.g., a value) associated with the periodicity and offset information element periodicityAndOffset that includes periodicity and/or offset information associated with the uplink traffic. The UE 120 may transmit the periodicity and offset information element to the network entity 405 via the UE assistance information. In some aspects, the UE 120 may map the information included in the periodicity and offset information element to the SR periodicity and SR offset parameters. In some aspects, based at least in part on the explicit information received from the application entity 505, the UE 120 may transmit the recommended SR periodicity and SR offset to the network entity 405. For example, the UE 120 may transmit the UE assistance information that includes an indication of the SR periodicity and SR offset parameters.

In some aspects, the UE assistance information may include one or more of the following: a UE delay budget report carrying a desired increment or decrement in a connected mode DRX cycle length, overheating assistance information, in-device coexistence (IDC) assistance information, a DRX parameter for power saving preference, a maximum aggregated bandwidth for power saving preference, a maximum number of secondary component carriers for power saving preference, a maximum number of MIMO layers for power saving preference, a minimum scheduling offset for cross-slot scheduling for power saving preference, an RRC state preference, a configured grant assistance information for NR sidelink communications, and/or a preference for being provisioned with reference time information. In some aspects, the UE assistance information may additionally, or alternatively, include an indication of the SR configuration parameters, such as an indication of the SR periodicity and SR offset parameters and/or information for determining the SR periodicity and SR offset parameters. In some aspects, the UE assistance information may indicate a preferred SR configuration. For example, the UE assistance information may explicitly indicate the SR periodicity parameter and/or the SR offset parameter. In some aspects, the UE assistance information may include traffic arrival offset information and periodicity information.

As shown in connection with reference number 520, the network entity 405 may transmit, and the UE 120 may receive, an SR configuration.

In some aspects, the network entity 405 may determine the SR configuration based at least in part on the UE assistance information. In some aspects, the network entity 405 may determine the SR configuration based at least in part on periodicity and offset information received from the UE 120. In some aspects, the network entity 405 may determine the SR configuration based at least in part on the explicitly indicated SR periodicity and the SR offset parameters received from the UE 120. In some aspects, the network entity 405 may perform an initial grant for a BSR transmission based at least in part on the periodicity and offset information and/or based at least in part on an average packet size. In some aspects, the network entity 405 may perform a data pre-allocation grant based at least in part on the periodicity and offset information and/or based at least in part on an average packet size. In some aspects, the network entity 405 may configure the SR PUCCH resources for the UE 120 based at least in part on the periodicity and offset information received from the UE 120. In some aspects, the network entity 405 may update the SR resource configuration information element (SchedulingRequestResourceConfiguration) with the periodicity and offset (periodicityAndOffset) that aligns (or nearly aligns) with the uplink traffic flow timing. As indicated above, the network entity 405 may transmit this information to the UE 120.

In some aspects, the SR periodicity may not align with the multimedia cadence. For example, the SR periodicity may be set to 10 ms, but the multimedia cadence may occur every 33.33 ms. In this example, the network entity 405 and/or the UE 120 may perform one or more actions to align the SR periodicity with the multimedia cadence. In one example, an offset may be applied to the SR periodicity such that the SR periodicity aligns with the multimedia cadence. For example, an offset of 3.33 ms may be applied to the SR periodicity such that the SR transmissions occur at 13.33 ms, 23.33 ms, 33.33 ms, etc. Thus, the SR periodicity may align with the multimedia cadence.

In some aspects, for some time division duplexing (TDD) slot formats, it may be difficult to match the SR occasions to the traffic cadence. For example, it may be difficult to match the SR occasions to the traffic cadence for a TDD slot format that includes three downlink (D) transmissions, a sidelink (S) transmission, and an uplink (U) transmission (DDDSU). In some aspects, the network entity 405 may align the SR occasions with a scheduling cycle associated with the multimedia traffic for the application entity 505 (such as for an XR application, gaming application, or other type of multimedia application in which bursts of periodic multimedia traffic are used). For example, the periodicity of the SR configuration may be aligned with the scheduling cycle associated with the periodic multimedia traffic. In some aspects, the network entity 405 may determine, based at least in part on the uplink traffic information, to configure a dense SR transmission period around the traffic arrivals.

In some aspects, a clock associated with the application entity 505 (an application clock) may not align with a clock associated with the modem or the UE 120 (a modem clock). For example, it is possible that the application clock and the modem clock may not be synchronized to separate clocks. In this example, a device-side time sensitive network (TSN) translator (DS-TT) may be used to synchronize the application clock and the modem clock (e.g., using timing handshakes). This may enable the uplink traffic flows to be aligned with the SR configuration.

In some aspects, if an average uplink packet size is known to the network entity 405, the network entity 405 may bypass the SR or BSR transmissions and may allocate uplink resources for data transmission. In some aspects, a unified air interface (UAI) may include packet size information (e.g., with the indication of the SR information) that enables the network entity 405 to allocate the uplink resources for the data transmission.

As shown in connection with reference number 525, the application entity 505 may transmit, and the UE 120 may receive, an uplink data flow. In some aspects, the uplink data flow may align with the periodicity and offset indicated in the SR resource configuration. This may enable the UE 120 to perform SR transmissions that align with the uplink data flow.

As shown in connection with reference number 530, the UE 120 may transmit, and the network entity 405 may receive, an indication of an optimal SR configuration. For example, the UE 120 may perform an SR transmission that aligns with the uplink data flow received from the application entity 505. In some aspects, the UE 120 may transmit an indication that the current SR configuration is an optimal SR configuration based at least in part on the uplink data flow. In some aspects, the UE 120 may transmit an indication (e.g., new UE assistance information) that indicates that the SR configuration should be updated based at least in part on the uplink data flow.

As described herein, the SRs for the UE 120 may be optimally configured by the network entity 405 based at least in part on the UE 120 indicating a preference associated with the SR configuration or based at least in part on the UE 120 indicating the uplink traffic information. In some aspects, a traffic arrival for a first set of UEs (UE1, UE3, and UE5) may have a similar cadence. Thus, the SRs for UE1, UE3, and UE5 may be multiplexed in the same PUCCH resource matching the uplink traffic arrival. In some aspects, a traffic arrival for a second set of UEs (UE2, UE4, and UE6) may have a similar cadence. Thus, the SRs for UE2, UE4, and UE6 may be multiplexed in the same PUCCH resource matching the uplink traffic arrival. The PUCCH resource for the first set of UEs may be different than the PUCCH resource for the second set of UEs. In some aspects, the network entity 405 may use the uplink traffic information to determine an optimal staggering and placement of the SRs.

In some aspects, the UE 120 may be associated with a plurality of uplink data streams. For example, the UE 120 may be associated with a first data stream corresponding to a control stream, a second data stream corresponding to an audio stream, and a third data stream corresponding to a video stream. In some aspects, the UE 120 may indicate uplink traffic information associated with two or more of the data streams. In this case, the network entity 405 may configure the logical channels with matched SRs for the two or more of the data streams. Additionally, or alternatively, the UE 120 may indicate a preferred SR configuration for each of the data streams, and the network entity 405 may transmit an SR configuration (or multiple SR configurations) based at least in part on the preferred SR configuration for the data streams.

As indicated above, FIG. 5 is provided as an example. Other examples may differ from what is described with regard to FIG. 5.

Figure 6:
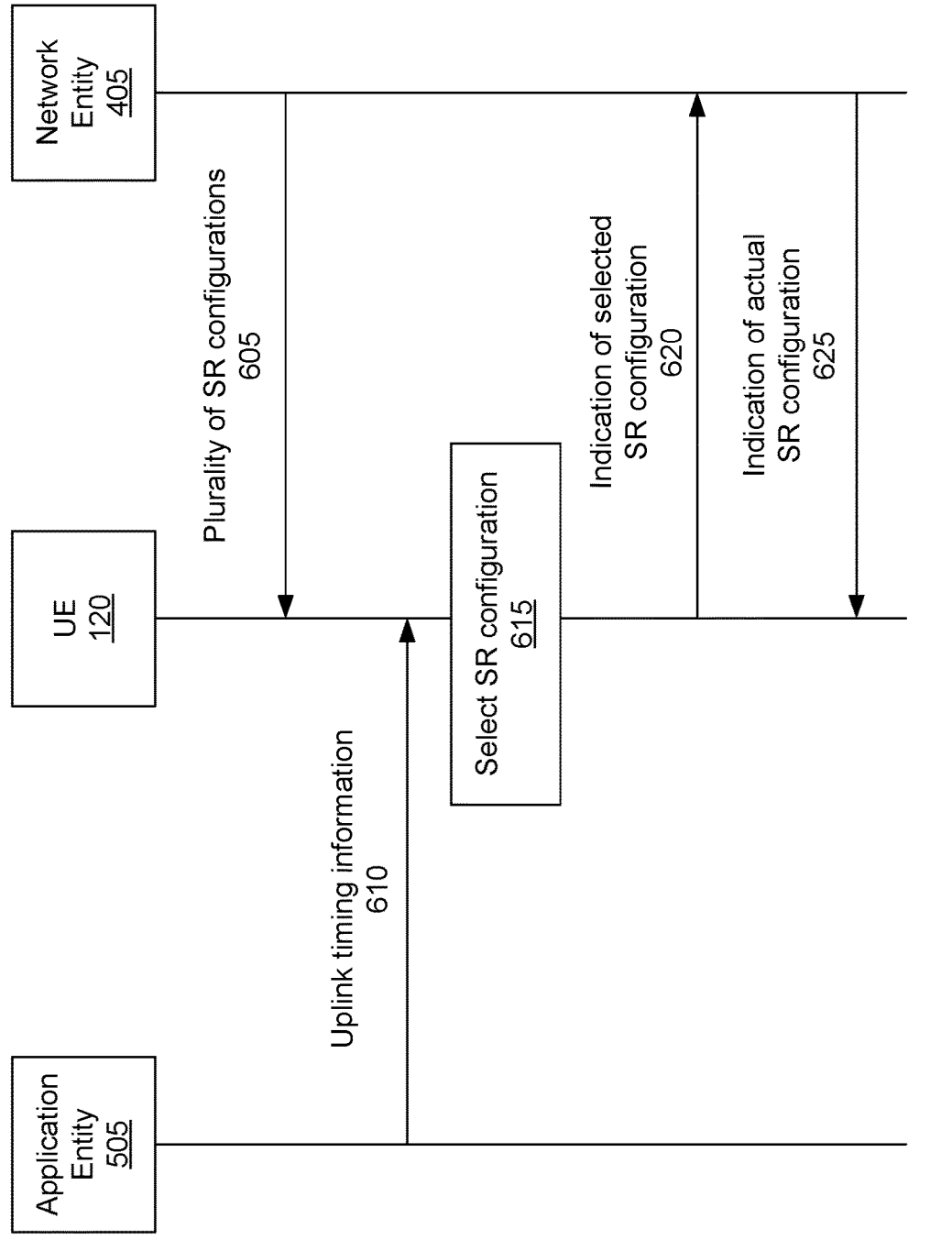
FIG. 6 is a diagram illustrating an example associated with SR configuration selection, in accordance with the present disclosure.

FIG. 6 is a diagram illustrating an example 600 of SR configuration selection, in accordance with the present disclosure.

As shown in connection with reference number 605, the network entity 405 may transmit, and the UE 120 may receive, a plurality of SR configurations. In some aspects, the network entity 405 may configure the UE 120 with the plurality of SR configurations using a scheduling request add or modify list indicator (schedulingRequestToAddModList). In some aspects, the network entity 405 may transmit the plurality of SR configurations based at least in part on uplink traffic information associated with one or more previous uplink data flows. For example, as described above with respect to FIG. 5, the network entity 405 may configure one or more of the plurality of SR configurations based at least in part on UE assistance information received from the UE 120.

As shown in connection with reference number 610, the application entity 505 may transmit, and the UE 120 may receive, uplink timing information. In some aspects, the UE 120 may receive the uplink timing information using the API. For example, the cross-layer API may enable the UE 120 to obtain information associated with the uplink traffic from the application entity 505. In some aspects, the UE 120 may obtain the uplink traffic information based at least in part on a machine learning algorithm. For example, the UE 120 may monitor the traffic that is being received from the application entity 505 and may determine one or more uplink traffic characteristics using the machine learning algorithm. In some aspects, the uplink timing information may include implicit timing information. For example, the application entity 505 may transmit, and the UE 120 may receive, an indication of a modem cadence or a timing offset associated with the uplink traffic flow. In some aspects, the uplink timing information may include explicit timing information. For example, the application entity 505 may transmit, and the UE 120 may receive, the periodicity and offset information element that includes periodicity information associated with the uplink traffic and/or offset information associated with the uplink traffic.

As shown in connection with reference number 615, the UE 120 may select an SR configuration from the plurality of SR configurations. In some aspects, the UE 120 may select the SR configuration from the plurality of SR configurations based at least in part on the uplink traffic information. For example, the UE 120 may select an SR configuration having one or more parameters that match (or closely match) the characteristics of the uplink data flow. In some aspects, the UE 120 may select an SR configuration having an SR periodicity and an SR offset that match (or closely match) the periodicity and offset of the uplink traffic. For example, if the uplink traffic has a periodicity of 5 ms, and the UE 120 is configured with three SR configurations having an SR periodicity of 2 ms, 4 ms, and 10 ms, respectively, the UE 120 may select the SR configuration having the SR periodicity of 4 ms.

As shown in connection with reference number 620, the UE 120 may transmit, and the network entity 405 may receive, an indication of the selected SR configuration. In some aspects, the UE 120 may transmit a MAC control element (MAC-CE) that indicates the selected SR configuration. In some aspects, one or more of the plurality of SR configurations may be associated with an indicator. For example, a first SR configuration may be associated with the indicator SR1, a second SR configuration may be associated with the indicator SR2, and a third SR configuration may be associated with the indicator SR3. In this case, transmitting the indication of the selected SR configuration may include transmitting the indication of the indicator corresponding to the selected SR configuration. For example, the UE 120 may transmit, and the network entity 405 may receive, an indication of SR2 which indicates that the UE 120 has selected the second SR configuration.

As shown in connection with reference number 625, the network entity 405 may transmit, and the UE 120 may receive, an indication of the actual SR configuration to be used. In some aspects, the network entity 405 may receive the indication of the selected SR configuration from the UE 120. In some aspects, the network entity 405 may transmit an indication for the UE 120 to use the selected SR configuration. In some aspects, the network entity 405 may transmit an indication for the UE 120 to use another SR configuration that is similar to the selected SR configuration. For example, the network entity 405 may transmit an indication for the UE 120 to use an SR configuration having a similar periodicity and/or offset as the selected SR configuration. In some aspects, transmitting the indication of the actual SR configuration may include transmitting a MAC-CE or downlink control information (DCI) that indicates the actual SR configuration.

In some aspects, a logical channel information element (LogicalChannelConfig) may be configured with an SR identifier (SchedulingRequestID). For example, the logical channel information element may be configured with an SR identifier that indicates the SR that is applicable for the logical channel. In some aspects, the logical channel information element may be configured with a plurality of SR identifiers. This may allow for multiple sets of SR configurations to be indicated for the logical channel. In some aspects, an allow SR list (allowSR-List) may allow the MAC service data units (SDUs) from the logical channel to be mapped to multiple SR configurations. Thus, multiple SR configurations (rather than a single SR configuration) may be configured for the logical channel. In some aspects, only a subset of the logical channels may be permitted to use a particular SR configuration.

As described herein, the network entity 405 may not be aware of uplink traffic information associated with the UE 120 and may not be able to determine an optimal SR configuration for the UE 120. This may result in increased latency, capacity loss, and increased power consumption. Using the techniques and apparatuses described herein, the network entity 405 may configure the UE 120 with a plurality of SR configurations, and the UE 120 may select an optimal SR configuration from the plurality of SR configurations based at least in part on uplink traffic information. This may reduce the likelihood of increased latency, capacity loss, and increased power consumption as a result of SR transmission timing.

As indicated above, FIG. 6 is provided as an example. Other examples may differ from what is described with regard to FIG. 6.

Figure 7:
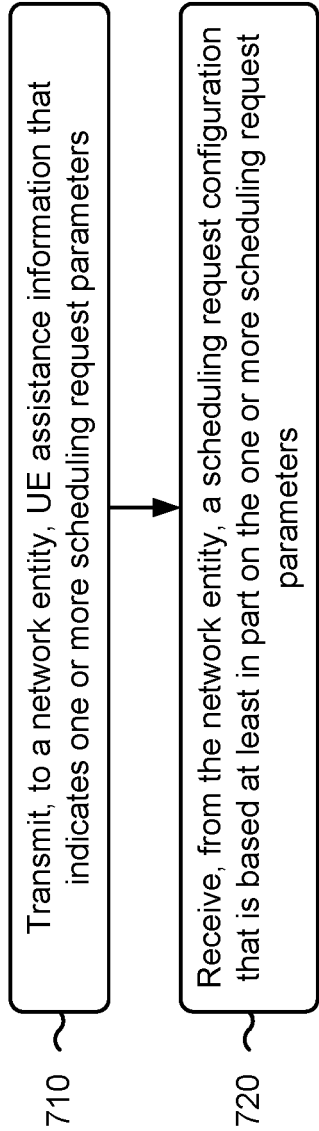
FIG. 7 is a diagram illustrating an example process associated with SR configuration, in accordance with the present disclosure.

FIG. 7 is a diagram illustrating an example process 700 performed, for example, by a UE, in accordance with the present disclosure. Example process 700 is an example where the UE (e.g., UE 120) performs operations associated with scheduling request configuration.

As shown in FIG. 7, in some aspects, process 700 may include transmitting, to a network entity, UE assistance information that indicates one or more scheduling request parameters (block 710). For example, the UE (e.g., using communication manager 140 and/or transmission component 1104, depicted in FIG. 11) may transmit, to a network entity, UE assistance information that indicates one or more scheduling request parameters, as described above.

As further shown in FIG. 7, in some aspects, process 700 may include receiving, from the network entity, a scheduling request configuration that is based at least in part on the one or more scheduling request parameters (block 720). For example, the UE (e.g., using communication manager 140 and/or reception component 1102, depicted in FIG. 11) may receive, from the network entity, a scheduling request configuration that is based at least in part on the one or more scheduling request parameters, as described above.

Process 700 may include additional aspects, such as any single aspect or any combination of aspects described below and/or in connection with one or more other processes described elsewhere herein.

In a first aspect, transmitting the UE assistance information comprises transmitting information that indicates a preferred scheduling request configuration.

In a second aspect, alone or in combination with the first aspect, the one or more scheduling request parameters comprise a periodicity or a timing offset.

In a third aspect, alone or in combination with one or more of the first and second aspects, process 700 includes obtaining uplink traffic information from an application entity associated with the UE or based at least in part on an uplink traffic flow.

In a fourth aspect, alone or in combination with one or more of the first through third aspects, obtaining the uplink traffic information comprises obtaining modem cadence information or timing offset information associated with uplink traffic.

In a fifth aspect, alone or in combination with one or more of the first through fourth aspects, process 700 includes determining the one or more scheduling request parameters based at least in part on the modem cadence information or the timing offset information associated with the uplink traffic.

In a sixth aspect, alone or in combination with one or more of the first through fifth aspects, obtaining the uplink traffic information comprises obtaining information that indicates a scheduling request periodicity or a scheduling request timing offset.

In a seventh aspect, alone or in combination with one or more of the first through sixth aspects, transmitting the one or more scheduling request parameters comprises transmitting an indication of the scheduling request periodicity or the scheduling request timing offset.

In an eighth aspect, alone or in combination with one or more of the first through seventh aspects, process 700 includes receiving, from the network entity, an indication of one or more physical uplink control channel resources for transmitting a scheduling request.

In a ninth aspect, alone or in combination with one or more of the first through eighth aspects, process 700 includes receiving, from the network entity, an initial grant for a buffer status report or an allocation for a data transmission based at least in part on the one or more scheduling request parameters and an average packet size.

In a tenth aspect, alone or in combination with one or more of the first through ninth aspects, process 700 includes transmitting a scheduling request based at least in part on the scheduling request configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
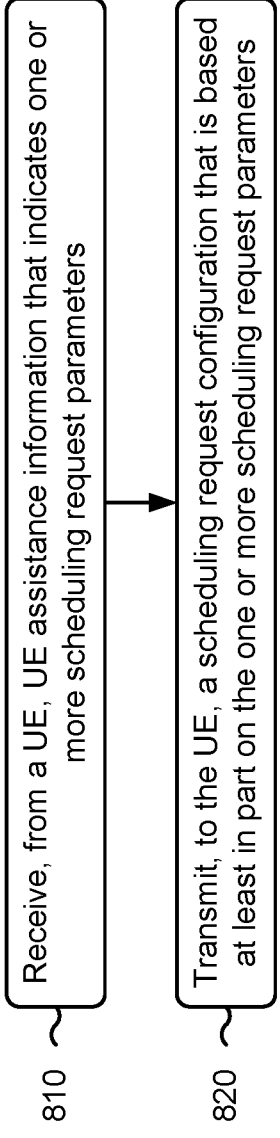
FIG. 8 is a diagram illustrating an example process associated with SR configuration, in accordance with the present disclosure.

FIG. 8 is a diagram illustrating an example process 800 performed, for example, by a network entity, in accordance with the present disclosure. Example process 800 is an example where the network entity (e.g., network entity 405) performs operations associated with scheduling request configuration.

As shown in FIG. 8, in some aspects, process 800 may include receiving, from a UE, UE assistance information that indicates one or more scheduling request parameters (block 810). For example, the network entity (e.g., using communication manager 150 and/or reception component 1202, depicted in FIG. 12) may receive, from a UE, UE assistance information that indicates one or more scheduling request parameters, as described above.

As further shown in FIG. 8, in some aspects, process 800 may include transmitting, to the UE, a scheduling request configuration that is based at least in part on the one or more scheduling request parameters (block 820). For example, the network entity (e.g., using communication manager 150 and/or transmission component 1204, depicted in FIG. 12) may transmit, to the UE, a scheduling request configuration that is based at least in part on the one or more scheduling request parameters, as described above.

Process 800 may include additional aspects, such as any single aspect or any combination of aspects described below and/or in connection with one or more other processes described elsewhere herein.

In a first aspect, receiving the UE assistance information comprises receiving information that indicates a preferred scheduling request configuration.

In a second aspect, alone or in combination with the first aspect, the one or more scheduling request parameters comprise a periodicity or a timing offset.

In a third aspect, alone or in combination with one or more of the first and second aspects, receiving the one or more scheduling request parameters comprises receiving one or more scheduling request parameters that are based at least in part on modem cadence information or timing offset information for uplink traffic associated with an application entity.

In a fourth aspect, alone or in combination with one or more of the first through third aspects, receiving the one or more scheduling request parameters comprises receiving one or more scheduling request parameters that are based at least in part on a scheduling request periodicity or a scheduling request timing offset for uplink traffic associated with an application entity.

In a fifth aspect, alone or in combination with one or more of the first through fourth aspects, process 800 includes transmitting, to the UE, an indication of one or more physical uplink control channel resources for transmitting a scheduling request.

In a sixth aspect, alone or in combination with one or more of the first through fifth aspects, process 800 includes transmitting, to the UE, an initial grant for a buffer status report or an allocation for a data transmission based at least in part on the one or more scheduling request parameters and an average packet size.

In a seventh aspect, alone or in combination with one or more of the first through sixth aspects, process 800 includes receiving a scheduling request that is based at least in part on the scheduling request configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
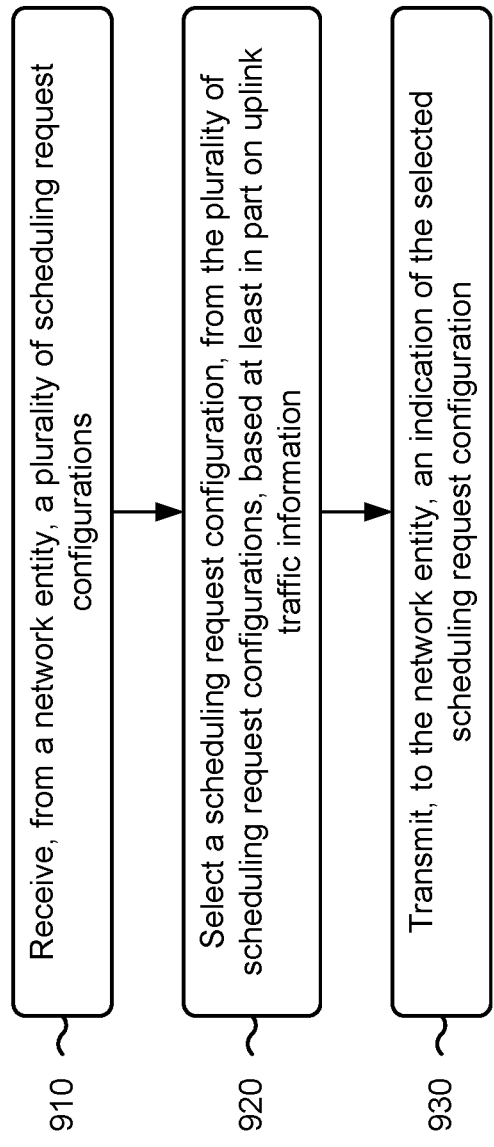
FIG. 9 is a diagram illustrating an example process associated with SR configuration selection, in accordance with the present disclosure.

FIG. 9 is a diagram illustrating an example process 900 performed, for example, by a UE, in accordance with the present disclosure. Example process 900 is an example where the UE (e.g., UE 120) performs operations associated with scheduling request configuration.

As shown in FIG. 9, in some aspects, process 900 may include receiving, from a network entity, a plurality of scheduling request configurations (block 910). For example, the UE (e.g., using communication manager 140 and/or reception component 1102, depicted in FIG. 11) may receive, from a network entity, a plurality of scheduling request configurations, as described above.

As further shown in FIG. 9, in some aspects, process 900 may include selecting a scheduling request configuration, from the plurality of scheduling request configurations, based at least in part on uplink traffic information (block 920). For example, the UE (e.g., using communication manager 140 and/or selection component 1112, depicted in FIG. 11) may select a scheduling request configuration, from the plurality of scheduling request configurations, based at least in part on uplink traffic information, as described above.

As further shown in FIG. 9, in some aspects, process 900 may include transmitting, to the network entity, an indication of the selected scheduling request configuration (block 930). For example, the UE (e.g., using communication manager 140 and/or transmission component 1104, depicted in FIG. 11) may transmit, to the network entity, an indication of the selected scheduling request configuration, as described above.

Process 900 may include additional aspects, such as any single aspect or any combination of aspects described below and/or in connection with one or more other processes described elsewhere herein.

In a first aspect, receiving the plurality of scheduling request configurations comprises receiving a logical channel information element that indicates a plurality of scheduling request configuration identifiers associated with respective scheduling request configurations of the plurality of scheduling request configurations, and transmitting the indication of the selected scheduling request configuration comprises transmitting an indication of a scheduling request configuration identifier corresponding to the selected scheduling request configuration.

In a second aspect, alone or in combination with the first aspect, transmitting the indication of the selected scheduling request configuration comprises transmitting a medium access control message that indicates the selected scheduling request configuration.

In a third aspect, alone or in combination with one or more of the first and second aspects, process 900 includes receiving a medium access control message or downlink control information that indicates a scheduling request configuration to be used by the UE.

In a fourth aspect, alone or in combination with one or more of the first through third aspects, process 900 includes obtaining the uplink traffic information from an application entity associated with the UE or based at least in part on an uplink traffic flow.

In a fifth aspect, alone or in combination with one or more of the first through fourth aspects, obtaining the uplink traffic information comprises obtaining modem cadence information or timing offset information associated with the uplink traffic.

In a sixth aspect, alone or in combination with one or more of the first through fifth aspects, obtaining the uplink traffic information comprises obtaining information that indicates a scheduling request periodicity or a scheduling request timing offset.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
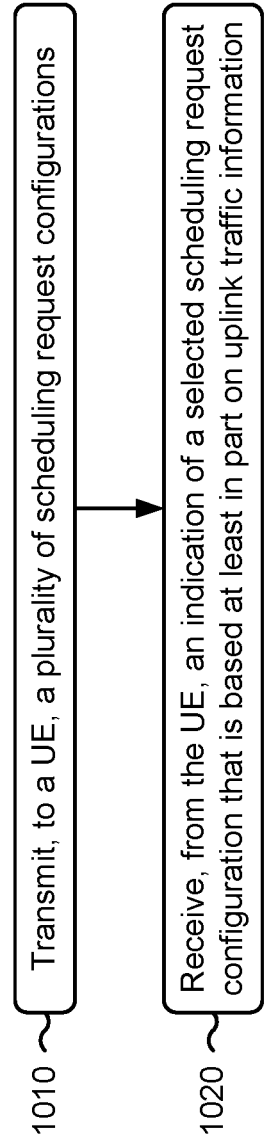
FIG. 10 is a diagram illustrating an example process associated with SR configuration selection, in accordance with the present disclosure.

FIG. 10 is a diagram illustrating an example process 1000 performed, for example, by a network entity, in accordance with the present disclosure. Example process 1000 is an example where the network entity (e.g., network entity 405) performs operations associated with scheduling request configuration.

As shown in FIG. 10, in some aspects, process 1000 may include transmitting, to a UE, a plurality of scheduling request configurations (block 1010). For example, the network entity (e.g., using communication manager 150 and/or transmission component 1204, depicted in FIG. 12) may transmit, to a UE, a plurality of scheduling request configurations, as described above.

As further shown in FIG. 10, in some aspects, process 1000 may include receiving, from the UE, an indication of a selected scheduling request configuration that is based at least in part on uplink traffic information (block 1020). For example, the network entity (e.g., using communication

US 12,574,917 B2

Figure 12:
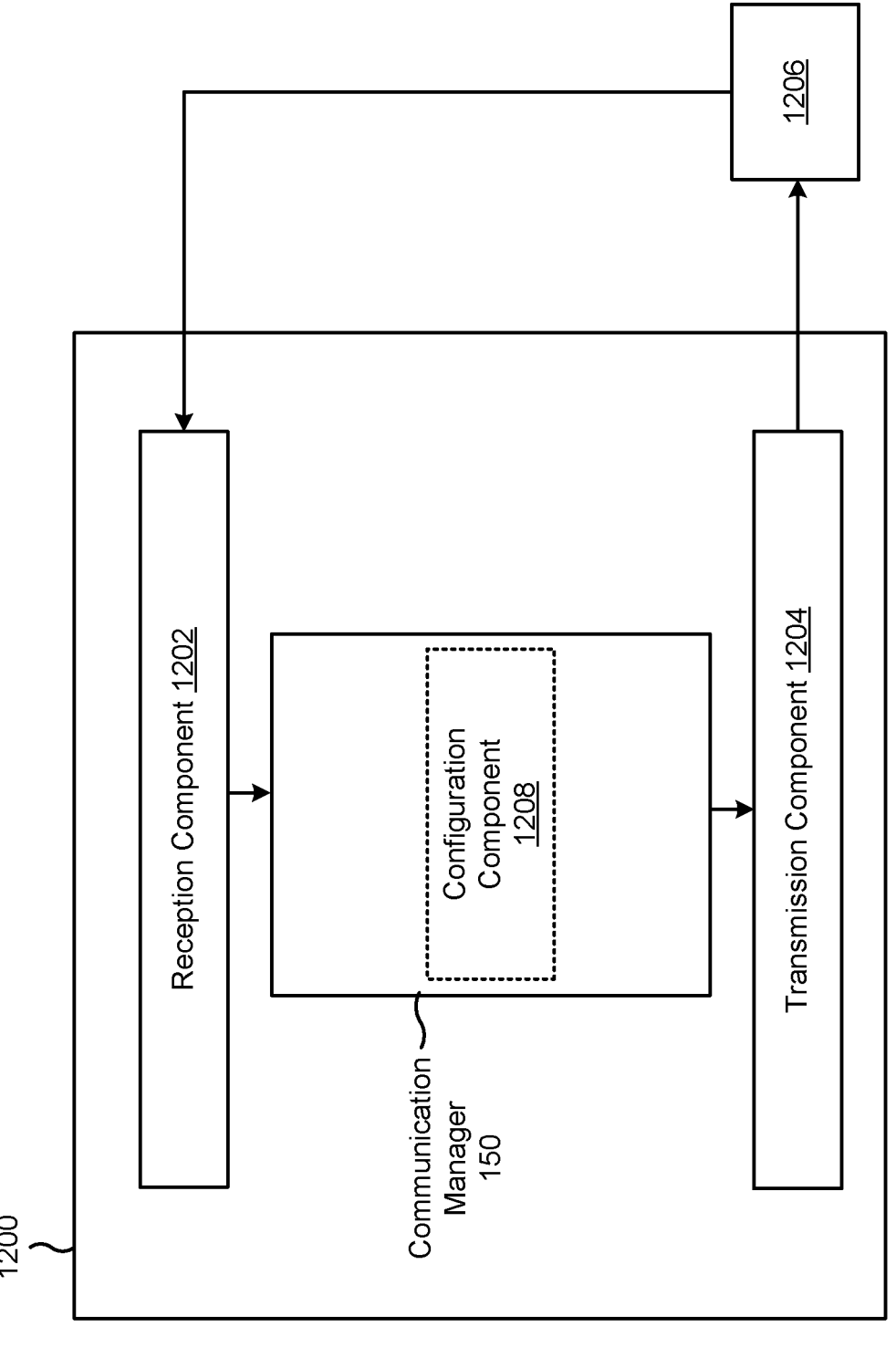
FIG. 12 is a diagram of an example apparatus for wireless communication, in accordance with the present disclosure.

27 manager 150 and/or reception component 1202, depicted in FIG. 12) may receive, from the UE, an indication of a selected scheduling request configuration that is based at least in part on uplink traffic information, as described above.

Process 1000 may include additional aspects, such as any single aspect or any combination of aspects described below and/or in connection with one or more other processes described elsewhere herein.

In a first aspect, transmitting the plurality of scheduling request configurations comprises transmitting a logical channel information element that indicates a plurality of scheduling request configuration identifiers associated with the plurality of scheduling request configurations, and receiving the indication of the selected scheduling request configuration comprises receiving an indication of a scheduling request configuration identifier corresponding to the selected scheduling request configuration.

In a second aspect, alone or in combination with the first aspect, receiving the indication of the selected scheduling request configuration comprises receiving a medium access control message that indicates the selected scheduling request configuration.

In a third aspect, alone or in combination with one or more of the first and second aspects, process 1000 includes transmitting a medium access control message or downlink control information that indicates a scheduling request configuration to be used by the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
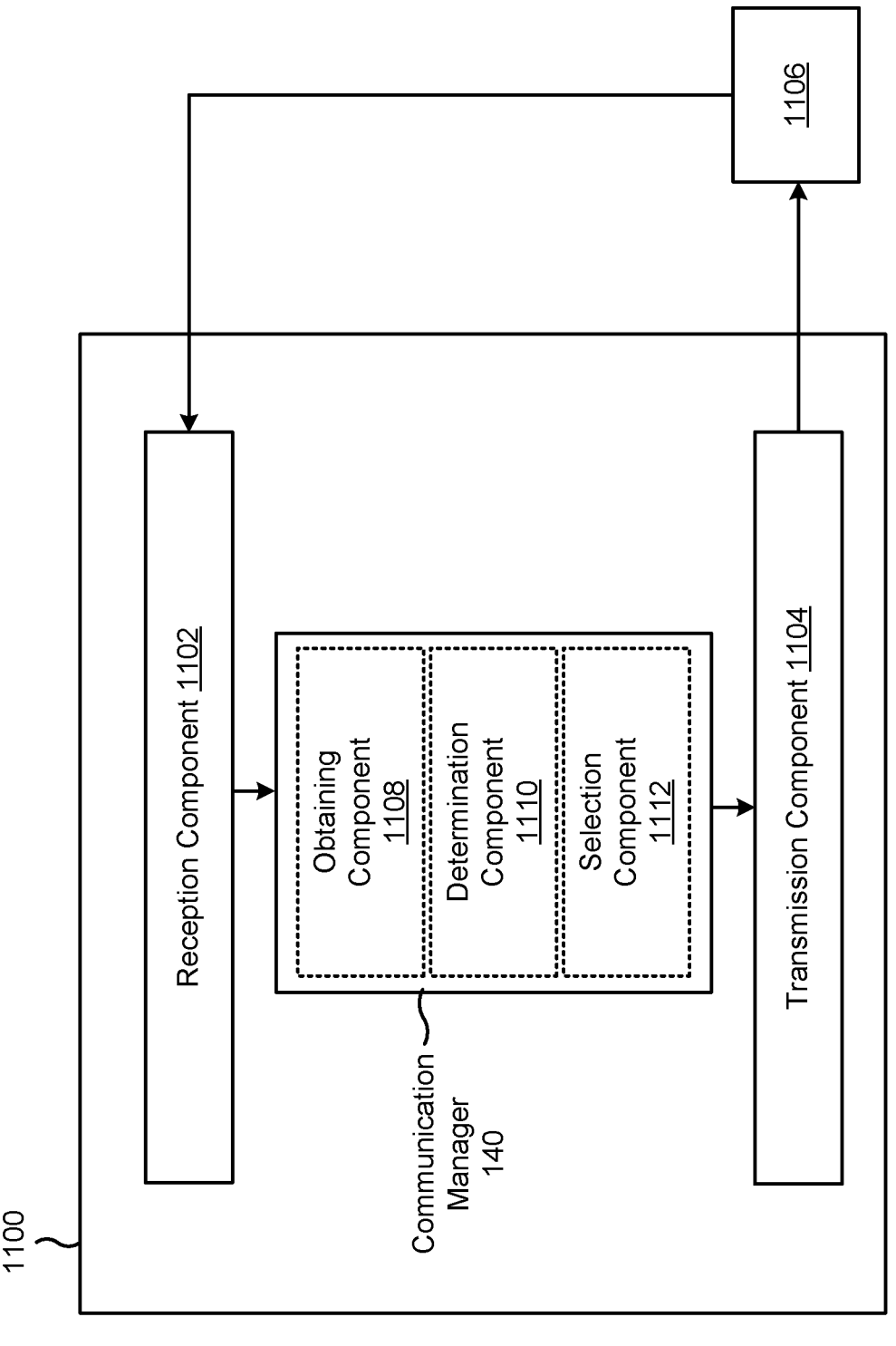
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an obtaining component 1108, a determination component 1110, or a selection component 1112, among other examples.

In some aspects, the apparatus 1100 may be configured to perform one or more operations described herein in connection with FIGS. 5-6. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit, to a network entity, UE assistance information that indicates one or more scheduling request parameters. The reception component 1102 may receive, from the network entity, a scheduling request configuration that is based at least in part on the one or more scheduling request parameters.

The obtaining component 1108 may obtain uplink traffic information from an application entity associated with the UE or based at least in part on an uplink traffic flow. The determination component 1110 may determine the one or more scheduling request parameters based at least in part on the modem cadence information or the timing offset information associated with the uplink traffic.

The reception component 1102 may receive, from the network entity, an indication of one or more physical uplink control channel resources for transmitting a scheduling request. The reception component 1102 may receive, from the network entity, an initial grant for a buffer status report or an allocation for a data transmission based at least in part on the one or more scheduling request parameters and an average packet size. The transmission component 1104 may transmit a scheduling request based at least in part on the scheduling request configuration.

The reception component 1102 may receive, from a network entity, a plurality of scheduling request configurations. The selection component 1112 may select a scheduling request configuration, from the plurality of scheduling request configurations, based at least in part on uplink traffic information. The transmission component 1104 may transmit, to the network entity, an indication of the selected scheduling request configuration.

The reception component 1102 may receive a medium access control message or downlink control information that indicates a scheduling request configuration to be used by the UE. The obtaining component 1108 may obtain the uplink traffic information from an application entity associated with the UE or based at least in part on an uplink traffic flow.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

FIG. 12 is a diagram of an example apparatus 1200 for wireless communication. The apparatus 1200 may be a network entity, or a network entity may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a configuration component 1208, among other examples.

In some aspects, the apparatus 1200 may be configured to perform one or more operations described herein in connection with FIGS. 5-6. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the network entity described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network entity described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network entity described in connection with FIG. 2. In some aspects, the transmission component 1204 may be co-located with the reception component 1202 in a transceiver.

The reception component 1202 may receive, from a UE, UE assistance information that indicates one or more scheduling request parameters. The transmission component 1204 may transmit, to the UE, a scheduling request configuration that is based at least in part on the one or more scheduling request parameters.

The transmission component 1204 may transmit, to the UE, an indication of one or more physical uplink control channel resources for transmitting a scheduling request. The transmission component 1204 may transmit, to the UE, an initial grant for a buffer status report or an allocation for a data transmission based at least in part on the one or more scheduling request parameters and an average packet size. The reception component 1202 may receive a scheduling request that is based at least in part on the scheduling request configuration.

The configuration component 1208 may obtain a plurality of scheduling request configurations for the UE. The transmission component 1204 may transmit, to a UE, a plurality of scheduling request configurations. The reception component 1202 may receive, from the UE, an indication of a selected scheduling request configuration that is based at least in part on uplink traffic information. The transmission component 1204 may transmit a medium access control message or downlink control information that indicates a scheduling request configuration to be used by the UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: transmitting, to a network entity, UE assistance information that indicates one or more scheduling request parameters; and receiving, from the network entity, a scheduling request configuration that is based at least in part on the one or more scheduling request parameters.

Aspect 2: The method of Aspect 1, wherein transmitting the UE assistance information comprises transmitting information that indicates a preferred scheduling request configuration.

Aspect 3: The method of any of Aspects 1-2, wherein the one or more scheduling request parameters comprise a periodicity or a timing offset.

Aspect 4: The method of any of Aspects 1-3, further comprising obtaining uplink traffic information from an application entity associated with the UE or based at least in part on an uplink traffic flow.

Aspect 5: The method of Aspect 4, wherein obtaining the uplink traffic information comprises obtaining modem cadence information or timing offset information associated with uplink traffic.

Aspect 6: The method of Aspect 5, further comprising determining the one or more scheduling request parameters based at least in part on the modem cadence information or the timing offset information associated with the uplink traffic.

Aspect 7: The method of Aspect 4, wherein obtaining the uplink traffic information comprises obtaining information that indicates a scheduling request periodicity or a scheduling request timing offset.

Aspect 8: The method of Aspect 7, wherein transmitting the one or more scheduling request parameters comprises transmitting an indication of the scheduling request periodicity or the scheduling request timing offset.

Aspect 9: The method of any of Aspects 1-8, further comprising receiving, from the network entity, an indication of one or more physical uplink control channel resources for transmitting a scheduling request.

Aspect 10: The method of any of Aspects 1-9, further comprising receiving, from the network entity, an initial grant for a buffer status report or an allocation for a data transmission based at least in part on the one or more scheduling request parameters and an average packet size.

Aspect 11: The method of any of Aspects 1-10, further comprising transmitting a scheduling request based at least in part on the scheduling request configuration.

Aspect 12: A method of wireless communication performed by a network entity, comprising: receiving, from a user equipment (UE), UE assistance information that indicates one or more scheduling request parameters; and transmitting, to the UE, a scheduling request configuration that is based at least in part on the one or more scheduling request parameters.

Aspect 13: The method of Aspect 12, wherein receiving the UE assistance information comprises receiving information that indicates a preferred scheduling request configuration.

Aspect 14: The method of any of Aspects 12-13, wherein the one or more scheduling request parameters comprise a periodicity or a timing offset.

Aspect 15: The method of any of Aspects 12-14, wherein receiving the one or more scheduling request parameters comprises receiving one or more scheduling request parameters that are based at least in part on modem cadence information or timing offset information for uplink traffic associated with an application entity.

Aspect 16: The method of any of Aspects 12-15, wherein receiving the one or more scheduling request parameters comprises receiving one or more scheduling request parameters that are based at least in part on a scheduling request periodicity or a scheduling request timing offset for uplink traffic associated with an application entity.

Aspect 17: The method of any of Aspects 12-16, further comprising transmitting, to the UE, an indication of one or more physical uplink control channel resources for transmitting a scheduling request.

Aspect 18: The method of any of Aspects 12-17, further comprising transmitting, to the UE, an initial grant for a buffer status report or an allocation for a data transmission based at least in part on the one or more scheduling request parameters and an average packet size.

Aspect 19: The method of any of Aspects 12-18, further comprising receiving a scheduling request that is based at least in part on the scheduling request configuration.

Aspect 20: A method of wireless communication performed by a user equipment (UE), comprising: receiving, from a network entity, a plurality of scheduling request configurations; selecting a scheduling request configuration, from the plurality of scheduling request configurations, based at least in part on uplink traffic information; and transmitting, to the network entity, an indication of the selected scheduling request configuration.

Aspect 21: The method of Aspect 20, wherein receiving the plurality of scheduling request configurations comprises receiving a logical channel information element that indicates a plurality of scheduling request configuration identifiers associated with respective scheduling request configurations of the plurality of scheduling request configurations, and wherein transmitting the indication of the selected scheduling request configuration comprises transmitting an indication of a scheduling request configuration identifier corresponding to the selected scheduling request configuration.

Aspect 22: The method of any of Aspects 20-21, wherein transmitting the indication of the selected scheduling request configuration comprises transmitting a medium access control message that indicates the selected scheduling request configuration.

Aspect 23: The method of any of Aspects 20-22, further comprising receiving a medium access control message or downlink control information that indicates a scheduling request configuration to be used by the UE.

Aspect 24: The method of any of Aspects 20-23, further comprising obtaining the uplink traffic information from an application entity associated with the UE or based at least in part on an uplink traffic flow.

Aspect 25: The method of Aspect 24, wherein obtaining the uplink traffic information comprises obtaining modem cadence information or timing offset information associated with the uplink traffic.

Aspect 26: The method of Aspect 24, wherein obtaining the uplink traffic information comprises obtaining information that indicates a scheduling request periodicity or a scheduling request timing offset.

Aspect 27: A method of wireless communication performed by a network entity, comprising: transmitting, to a user equipment (UE), a plurality of scheduling request configurations; and receiving, from the UE, an indication of a selected scheduling request configuration that is based at least in part on uplink traffic information.

Aspect 28: The method of Aspect 27, wherein transmitting the plurality of scheduling request configurations comprises transmitting a logical channel information element that indicates a plurality of scheduling request configuration identifiers associated with the plurality of scheduling request configurations, and wherein receiving the indication of the selected scheduling request configuration comprises receiving an indication of a scheduling request configuration identifier corresponding to the selected scheduling request configuration.

Aspect 29: The method of any of Aspects 27-28, wherein receiving the indication of the selected scheduling request configuration comprises receiving a medium access control message that indicates the selected scheduling request configuration.

Aspect 30: The method of any of Aspects 27-29, further comprising transmitting a medium access control message or downlink control information that indicates a scheduling request configuration to be used by the UE.

Aspect 31: An apparatus for wireless communication at a device, comprising a processor; memory coupled with the processor; and instructions stored in the memory and executable by the processor to cause the apparatus to perform the method of one or more of Aspects 1-11.

Aspect 32: A device for wireless communication, comprising memory, and one or more processors coupled to the memory, the memory comprising instructions executable by the one or more processors to cause the device to perform the method of one or more of Aspects 1-11.

Aspect 33: A device for wireless communication, comprising a memory and one or more processors coupled to the memory, the one or more processors configured to perform the method of one or more of Aspects 1-11.

Aspect 34: An apparatus for wireless communication, comprising at least one means for performing the method of one or more of Aspects 1-11.

Aspect 35: A non-transitory computer-readable medium storing code for wireless communication, the code comprising instructions executable by a processor to perform the method of one or more of Aspects 1-11.

Aspect 36: A non-transitory computer-readable medium storing a set of instructions for wireless communication, the set of instructions comprising one or more instructions that, when executed by one or more processors of a device, cause the device to perform the method of one or more of Aspects 1-11.

Aspect 37: An apparatus for wireless communication at a device, comprising a processor; memory coupled with the processor; and instructions stored in the memory and executable by the processor to cause the apparatus to perform the method of one or more of Aspects 12-19.

Aspect 38: A device for wireless communication, comprising memory, and one or more processors coupled to the memory, the memory comprising instructions executable by the one or more processors to cause the device to perform the method of one or more of Aspects 12-19.

Aspect 39: A device for wireless communication, comprising a memory and one or more processors coupled to the memory, the one or more processors configured to perform the method of one or more of Aspects 12-19.

Aspect 40: An apparatus for wireless communication, comprising at least one means for performing the method of one or more of Aspects 12-19.

Aspect 41: A non-transitory computer-readable medium storing code for wireless communication, the code comprising instructions executable by a processor to perform the method of one or more of Aspects 12-19.

Aspect 42: A non-transitory computer-readable medium storing a set of instructions for wireless communication, the set of instructions comprising one or more instructions that, when executed by one or more processors of a device, cause the device to perform the method of one or more of Aspects 12-19.

Aspect 43: An apparatus for wireless communication at a device, comprising a processor; memory coupled with the processor; and instructions stored in the memory and executable by the processor to cause the apparatus to perform the method of one or more of Aspects 20-26.

Aspect 44: A device for wireless communication, comprising memory, and one or more processors coupled to the memory, the memory comprising instructions executable by the one or more processors to cause the device to perform the method of one or more of Aspects 20-26.

Aspect 45: A device for wireless communication, comprising a memory and one or more processors coupled to the memory, the one or more processors configured to perform the method of one or more of Aspects 20-26.

Aspect 46: An apparatus for wireless communication, comprising at least one means for performing the method of one or more of Aspects 20-26.

Aspect 47: A non-transitory computer-readable medium storing code for wireless communication, the code comprising instructions executable by a processor to perform the method of one or more of Aspects 20-26.

Aspect 48: A non-transitory computer-readable medium storing a set of instructions for wireless communication, the set of instructions comprising one or more instructions that, when executed by one or more processors of a device, cause the device to perform the method of one or more of Aspects 20-26.

Aspect 49: An apparatus for wireless communication at a device, comprising a processor; memory coupled with the processor; and instructions stored in the memory and executable by the processor to cause the apparatus to perform the method of one or more of Aspects 27-30.

Aspect 50: A device for wireless communication, comprising memory, and one or more processors coupled to the memory, the memory comprising instructions executable by the one or more processors to cause the device to perform the method of one or more of Aspects 27-30.

Aspect 51: A device for wireless communication, comprising a memory and one or more processors coupled to the memory, the one or more processors configured to perform the method of one or more of Aspects 27-30.

Aspect 52: An apparatus for wireless communication, comprising at least one means for performing the method of one or more of Aspects 27-30.

Aspect 53: A non-transitory computer-readable medium storing code for wireless communication, the code comprising instructions executable by a processor to perform the method of one or more of Aspects 27-30.

Aspect 54: A non-transitory computer-readable medium storing a set of instructions for wireless communication, the set of instructions comprising one or more instructions that, when executed by one or more processors of a device, cause the device to perform the method of one or more of Aspects 27-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

36

What is claimed is:

1. A user equipment (UE) for wireless communication, comprising:
one or more memories; and
one or more processors coupled to the one or more memories, the one or more memories comprising instructions executable by the one or more processors to cause the UE to:
obtain uplink traffic information including modem cadence information associated with uplink traffic, wherein:
the uplink traffic information is from an application entity, different from the UE, associated with an application running on the UE, or
the uplink traffic information is based at least in part on using a learning algorithm on an uplink traffic flow received from the application entity;
transmit, to a network entity and based at least in part on the uplink traffic information, UE assistance information that indicates one or more scheduling request parameters; and
receive, from the network entity, a scheduling request configuration that is based at least in part on the one or more scheduling request parameters.

2. The UE of claim 1, wherein the UE assistance information further indicates a preferred scheduling request configuration.

3. The UE of claim 1, wherein the one or more scheduling request parameters comprise a periodicity or a timing offset.

4. The UE of claim 1, wherein the uplink traffic information further includes timing offset information associated with the uplink traffic.

5. The UE of claim 1, wherein the one or more memories further comprises instructions executable by the one or more processors to cause the UE to determine the one or more scheduling request parameters based at least in part on the modem cadence information.

6. The UE of claim 1, wherein the uplink traffic information further includes a scheduling request periodicity or a scheduling request timing offset.

7. The UE of claim 6, wherein the UE assistance information includes an indication of the scheduling request periodicity or the scheduling request timing offset.

8. The UE of claim 1, wherein the one or more memories further comprise instructions executable by the one or more processors to cause the UE to receive, from the network entity, an indication of one or more physical uplink control channel resources for transmitting a scheduling request.

9. The UE of claim 1, wherein the one or more memories further comprise instructions executable by the one or more processors to cause the UE to receive, from the network entity and based at least in part on the one or more scheduling request parameters and an average packet size, an initial grant for a buffer status report or an allocation for a data transmission.

10. The UE of claim 1, wherein the one or more memories further comprises instructions executable by the one or more processors to cause the UE to transmit a scheduling request based at least in part on the scheduling request configuration.

11. The UE of claim 1,
wherein the uplink traffic information comprises an indication of a periodicity and an offset of uplink traffic flows, the indication obtained from the application entity via a cross-layer application programming interface.

12. The UE of claim 1,
wherein the UE assistance information further indicates an average uplink packet size, and wherein the scheduling request configuration is based at least in part on the average uplink packet size.

13. The UE of claim 1,
wherein the uplink traffic information corresponds to a plurality of uplink traffic flows, and the UE assistance information indicates a scheduling request periodicity and offset for each of the plurality of uplink traffic flows.

14. A network entity for wireless communication, comprising:
one or more memories; and
one or more processors coupled to the one or more memories, the one or more memories comprising instructions executable by the one or more processors to cause the network entity to:
receive, from a user equipment (UE), UE assistance information that indicates one or more scheduling request parameters,
wherein the UE assistance information is based at least in part on uplink traffic information, wherein:
the uplink traffic information is from an application entity, different from the UE, associated with an application running on the UE, or
the uplink traffic information is based at least in part on using a learning algorithm on an uplink traffic flow received from the application entity, and
wherein the one or more scheduling request parameters are based at least in part on modem cadence information for uplink traffic associated with the application entity; and
transmit, to the UE, a scheduling request configuration that is based at least in part on the one or more scheduling request parameters.

15. The network entity of claim 14,
wherein the UE assistance information further indicates a preferred scheduling request configuration.

16. The network entity of claim 14,
wherein the one or more scheduling request parameters comprise a periodicity or a timing offset.

17. The network entity of claim 14,
wherein the one or more scheduling request parameters are further based at least in part on timing offset information for the uplink traffic.

18. The network entity of claim 14,
wherein the UE assistance information includes an indication of a scheduling request periodicity or a scheduling request timing offset for the uplink traffic.

19. The network entity of claim 14,
wherein the one or more memories further comprise instructions executable by the one or more processors to cause the network entity to transmit, to the UE, an indication of one or more physical uplink control channel resources for transmitting a scheduling request.

20. The network entity of claim 14,
wherein the one or more memories further comprise instructions executable by the one or more processors to cause the network entity to transmit, to the UE and based at least in part on the one or more scheduling request parameters and an average packet size, an initial grant for a buffer status report or an allocation for a data transmission.

21. The network entity of claim 14, wherein the one or more memories further comprises-comprise instructions executable by the one or more processors to cause the network entity to receive a scheduling request that is based at least in part on the scheduling request configuration.

22. A method of wireless communication performed by a user equipment (UE), comprising:
obtaining uplink traffic information including modem cadence information associated with uplink traffic, wherein:
the uplink traffic information is from an application entity, different from the UE, associated with an application running on the UE, or
the uplink traffic information is based at least in part on using a learning algorithm on an uplink traffic flow received from the application entity;
transmitting, to a network entity and based at least in part on the uplink traffic information, UE assistance information that indicates one or more scheduling request parameters; and
receiving, from the network entity, a scheduling request configuration that is based at least in part on the one or more scheduling request parameters.

23. The method of claim 22,
wherein the UE assistance information further indicates a preferred scheduling request configuration.

24. The method of claim 22,
wherein the one or more scheduling request parameters comprise a periodicity or a timing offset.

25. The method of claim 22, further comprising
receiving, from the network entity, an indication of one or more physical uplink control channel resources for transmitting a scheduling request.

26. The method of claim 22, further comprising
receiving, from the network entity and based at least in part on the one or more scheduling request parameters and an average packet size, an initial grant for a buffer status report or an allocation for a data transmission.

27. A non-transitory computer-readable medium storing one or more instructions for wireless communication, the one or more instructions, when executed by one or more processors of a user equipment (UE), cause the UE to:
obtain uplink traffic information including modem cadence information associated with uplink traffic, wherein:
the uplink traffic information is from an application entity, different from the UE, associated with an application running on the UE, or
the uplink traffic information is based at least in part on using a learning algorithm on an uplink traffic flow received from the application entity;
transmit, to a network entity and based at least in part on the uplink traffic information, UE assistance information that indicates one or more scheduling request parameters, wherein the UE assistance information is based at least in part on the uplink traffic information; and
receive, from the network entity, a scheduling request configuration that is based at least in part on the one or more scheduling request parameters.

28. The non-transitory computer-readable medium of claim 27, wherein the UE assistance information further indicates a preferred scheduling request configuration.

29. The non-transitory computer-readable medium of claim 27, wherein the one or more scheduling request parameters comprise a periodicity or a timing offset.

30. The non-transitory computer-readable medium of claim 27, wherein the one or more instructions further cause the UE to receive, from the network entity, an indication of one or more physical uplink control channel resources for transmitting a scheduling request.

* * * * *